United States Patent

Gibson

[15] 3,694,752

[45] Sept. 26, 1972

[54] HIGH SPEED TRANSMISSION RECEIVER UTILIZING FINE RECEIVER TIMING AND CARRIER PHASE RECOVERY

[72] Inventor: Earl D. Gibson, Huntington Beach, Calif.

[73] Assignee: North American Rockwell Corporation

[22] Filed: March 18, 1971

[21] Appl. No.: 125,660

[52] U.S. Cl. .......................325/323, 325/42, 333/18

[51] Int. Cl. ..............................................H04b 1/10

[58] Field of Search..........325/42, 65, 321, 322, 325, 325/323; 178/69.5 R; 333/18; 328/155; 340/168 R

[56] References Cited

UNITED STATES PATENTS

| | | | |
|---|---|---|---|
| 3,242,462 | 3/1966 | Funk et al. | 325/42 X |
| 3,407,356 | 10/1968 | Meranda | 328/155 X |
| 3,529,250 | 9/1970 | Farrow et al. | 328/155 |
| 3,591,720 | 7/1971 | Othmer | 178/69.5 R |

*Primary Examiner*—Benedict V. Safourek
*Attorney*—L. Lee Humphries, H. Fredrick Hamann and Edward Dugas

[57] ABSTRACT

The invention is directed to an improvement in a digital data receiver of the type which utilizes an adaptive equalizer having a plurality of adjustable attenuators to remove distortion in received signals. The improvement comprises a system which utilizes the signals available at the equalizer adjustable attenuators to achieve accurate and stable carrier phase and timing control signals.

5 Claims, 13 Drawing Figures

INVENTOR
EARL D. GIBSON
BY Edward Dugas
ATTORNEY

INVENTOR
EARL D. GIBSON
BY *Edward Dugas*
ATTORNEY

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY
Edward Dugas
ATTORNEY

INVENTOR
EARL D. GIBSON
BY
Edward Dugas
ATTORNEY

INVENTOR
EARL D. GIBSON
BY Edward Dugas
ATTORNEY

HIGH SPEED TRANSMISSION RECEIVER UTILIZING FINE RECEIVER TIMING AND CARRIER PHASE RECOVERY

BACKGROUND OF THE INVENTION

For high performance data transmission, it is essential that most of the signal power and channel bandwidth be devoted to the data signal, not to special signals for timing or carrier recovery. Some previous methods of timing and carrier recovery have used special signals, such as tones; whereas, others have used some function of the data signal, such as zero-crossings. In all known previous methods, however, disturbances such as intersymbol interference, pseudo-random signal components, interference between data and tone, and/or noise have led to substantial fluctuation or "jitter" on the timing and carrier phase except when a large percentage of the signal power and/or bandwidth is devoted to special signals for timing and carrier phase recovery. Furthermore, receivers for exceptionally high data rates over given bandwidth are inherently highly sensitive to "jitter" in timing or carrier phase.

In some data transmission systems a phase locked loop is used to recover timing or the carrier from either a transmitted tone or tones or some function of the data signal. However, on channels with strong delay distortion, the timing or carrier recovered by the phase locked loop often has a large, fixed or slowly varying phase offset relative to the optimum phase. This is especially true when a tone for these purposes is transmitted near the band edge of a channel with strong band-edge delay distortion. Use of a carrier with a fixed phase error for demodulation can severely distort the demodulated signal, especially in single sideband or vestigial sideband data communication systems. Although an adaptive equalizer can correct most of this distortion, use of the equalizer to correct this unnecessary distortion degrades the overall receiver performance and leads to more expensive equalizer.

A single tone received on a channel with strong delay distortion contains essentially no information concerning the optimum timing or carrier phase. It is necessary to use the data signal or some special signal components that occupy all or most of the channel bandwidth in order to identify the optimum phase. Since the transmission of special signal components utilizes signal power and spectrum that would otherwise be available for data, use of the data signal itself for timing and carrier recovery is essential for high efficiency of data communications. However, learning of the correct timing and carrier phase from a pseudo-random data signal in the presence of noise tends to lead to fluctuations of the learned timing and carrier phase; whereas such fluctuations must be kept exceedingly small in order to achieve exceptionally high performance data transmission. Therefore, the major objective of the techniques described herein is to use the regular data signal to control the timing and carrier phase without allowing the pseudo-random data signal components and noise to cause significant phase fluctuations in the timing or carrier. A second objective is to adaptively adjust the timing and carrier phase to approximately the optimum values from the viewpoint of overall receiver performance. A third objective is to use tap-gain adjustments already available from an adaptive equalizer to control the timing and carrier phase, thereby eliminating the need for extra hardware to generate such control signals.

It is important to consider the timing, carrier recovery and equalization together because these devices must perform at the proper relative rates and otherwise function well together in order to provide high precision of equalization and other functions required for high performance data transmission. Also, after very coarse initial timing and carrier phase correction has been provided by separate devices, it is still essential for the fine timing, fine carrier phase and equalization to automatically converge to near-optimum adjustments; and these devices must each operate at approximately the proper relative rate at each point in the convergence process.

It is also essential to consider a variety of tradeoffs involving many interrelated considerations, such as precision of the equalization, timing and carrier phase versus making these functions fast enough to correct variable channel characteristics plus variable imperfections in the hardware, such as the stable clock and frequency translators.

SUMMARY OF THE INVENTION

In the preferred embodiment of the invention, there is provided an adjustable transversal equalizer having a plurality of delay line taps including a centrally located major tap with an adjustable attenuator connected to each of the taps. A summation circuit combines the attenuated outputs of the taps along with the main tap signal into the single coordinated signal. A first comparing means provides a signal which indicates the sign of the difference between the first set of tap gains located on either side of the main signal tap. A second comparing means provides a difference signal that indicates the sign of the difference between tap gains located on either side of the first set of tap gains.

A first and second gate means are connected to receive the sign of difference signals from the first and second comparing means, respectively, and for gating these signals to individual output terminals upon receipt of a control signal. A first and second pulse generator means generating trains of pulses are provided. The output pulses from the first pulse generating means are the system's output carrier pulses, whereas the output pulses from the second pulse generating means are the system's output timing pulses.

Each of the two pulse generator means contains a frequency divider and adds or deletes pulses to the pulse train at the input of the frequency divider in order to shift the phase of the pulse train at the output of the frequency divider. The sign of tap-gain difference signals from the aforementioned first and second comparators (after passing through the aforementioned gates) control the choice between pulse addition and pulse deletion in the first and second pulse generator means, respectively.

The output timing pulses after frequency division are fed back to the first and second gate means as the gating control signals. Alternating switch means for alternately connecting the output terminal from the second gate means to the input of the first and second pulse generating means is provided and remains in each of its two switch positions for approximately 8 bauds out of 16. A switch means is interposed at the input of the first pulse generating means for connecting that input to either the output terminal of the first gating means or to the output of the alternating switch means. The switch means are operated in accordance with three adjustments modes to achieve the desired timing and carrier phase recovery.

It is, therefore, a primary object of the present invention to provide an improved system for use with a transversal equalizer which system provides a carrier and timing control signal.

It is another object of the present invention to provide a fine timing and carrier phase control system having three adjustment modes.

It is a further object of the present invention to provide a timing and carrier phase control system which system operates on the received signal without utilizing pilot tones or other signals being superimposed on the transmitted signal.

These and other objects of the present invention will become more apparent and better understood when taken in conjunction with the following description and drawings, throughout which like characters indicate like parts, and which drawings form a part of this application.

DESCRIPTION OF THE PREFERRED EMBODIMENTS

Figure 1:
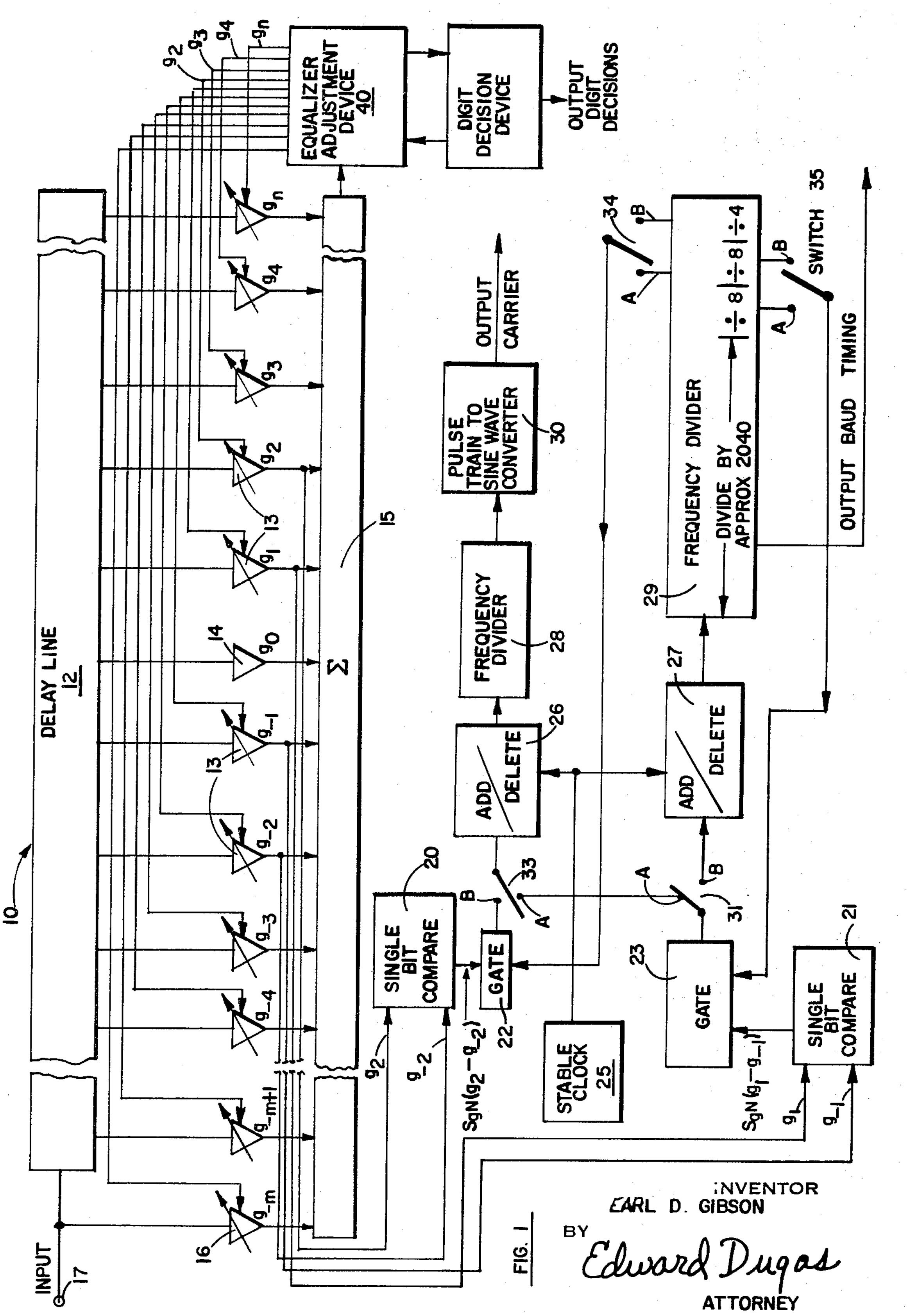
FIG. 1 illustrates in block diagram form the preferred embodiment of the invention.

Referring to FIG. 1; a transversal equalizer 10 is shown comprised of delay line 12 having a plurality of tapped delay sections. Each of the tapped delay sections is connected to an adjustable attenuator 13 with a central delay tap corresponding to a major signal component being connected to an adjustable attenuator 14. The output of each attenuator is labeled with a $g$ subscript. The major attenuator is labeled $g_o$, with the taps adjacent being labeled with subscripts and signs corresponding to their distance and direction from $g_o$. Each attenuator output provides a delayed signal which is a replica of the demodulated received signal which appears at the input terminal 17 of delay line 12. The demodulated signal is processed by the forward end of the receiver in a standard manner in that it is received, demodulated, and filtered prior to being fed to the transversal equalizer 10. One adjustable attenuator 16 receives this received demodulated signal directly and provides an attenuated output at terminal $g_{-m}$. The outputs of each of the adjustable attenuators are summed by a summing device 15 to provide a signal which is the composite of all the signals appearing at all of the adjustable attenuator outputs.

The signal fed to input terminal 17 of the equalizer 10 is operated upon by the equalizer which is automatically and continually (or frequently) adjusted to approximately eliminate intersymbol interference caused by amplitude-frequency and delay-frequency characteristics of the channel. The equalized signal samples are fed to a decision device 40, which evaluates the digits which ere transmitted over the channel. These digit decisions are fed back to the adaptive equalizer for use in adapting the equalizer to the channel characteristics. An automatic equalizer which may be used with the present invention is disclosed in U. S. Pat. application Ser. No. 79,380, entitled "Automatic Transversal Equalizer System" by Earl D. Gibson, the inventor of the present system. In an adaptive transversal equalizer, signals for controlling the tap-gains are continually being derived and these signals can be used directly as the input signals $g_{-1}$, $g_1$, $g_{-2}$ and $g_2$ to the fine timing and fine carrier phase recovery.

A single bit compare circuit 20 is connected to the attenuator outputs designated $g_2$ and $g_{-2}$. The single bit compare circuit 20 compares each pair of signals present at its input terminal and determines the sign difference thereof, that is, it determines the difference given by the formula Sgn $(g_2 - g_{-2})$. To determined Sgn $(g_2 - g_{-2})$, it is only necessary to compare the most significant bits of $g_2$ and $g_{-2}$ when these quantities are stored digitally. This output signal is then fed to gate 22, which gate, upon receipt of a control signal, gates the sign difference signal to terminal B of switch 33. In an identical manner, the single bit compare circuit 21 detects the signal present on attenuator outputs designated $g_{-1}$ and $g_1$ and provides a sign difference signal which is proportional to Sgn$(g_1 - g_{-1})$. This sign difference signal is then fed to gate 23 which gate, upon receipt of a control signal, passes this sign difference signal to an alternating switch 31. The alternating switch 31 connects the output of gate 23, alternately, to terminals A and B of switch 31. In practice, the fixed rate of alternation is once every eight bauds, i.e., the switch remains in each position for eight bauds out of sixteen at the baud rate of transmission. Terminal A of switch 31 is connected to terminal A of switch 33. The movable arm of switch 33 is connected to the input of an ADD/DELETE circuit 26 with the terminal B of switch 31 connected to a similar ADD/DELETE circuit 27. In operation, the timing of ADD/DELETE circuits 26 and 27 are staggered such that one does not operate while the other is in operation. The ADD/DELETE circuits also receive as an input a pulse train which is generated by a stable clock 25. The frequency rate of the pulse train is greater than the baud rate of the transmission used. For example, in the preferred embodiment, a clock frequency of 9.8 megahertz is used while the transmission rate is 4,800 bauds per second. In operation, a pulse is either added or deleted to the train of pulses from the stable clock under the direction of the sign difference signals from either gate 22 or gate 23. The output pulse train appearing at the output of the ADD/DELETE circuits will, therefore, have a frequency which is substantially greater than the baud timing or carrier rate. Frequency dividers 28 and 29 are utilized to divide the pulse trains down in frequency to correspond to the carrier frequency and baud timing rate, respectively. The output of frequency divider 28 is fed to the filter 30 which filter converts the pulse train into a corresponding sine wave. Frequency divider 29 first divides the pulse train rate by approximately 2,040 to provide the system's output baud timing signal. This output is then divided by a factor of eight to provide an output A at switch 35, and is again divided by a factor of eight to provide an output B at switch 35, and the same output at terminal A of switch 34. The pulse train then is divided once more by a factor of four to provide an output at terminal B of switch 34. The moveable arm of switch 34 is connected back to control the gating action of gate 22. The moveable arm of switch 35 is connected back to control the gating action of gate 23. Switches 31, 33, 34 and 35 are operated in three modes as set forth by the following chart:

SWITCHING AND INCREMENT RATES FOR THE THREE OPERATING MODES

| Mode | Switch Positions | | | | No. of Bauds Per Increment | |
|---|---|---|---|---|---|---|
| | Switch 33 | Switch 31 | Switch 34 | Switch 35 | Timing | Phase |
| 1 | A | Alternate 8 | — | A | 16 | 16 |
| 2 | B | Alternate 8 | A | A | 16 | 64 |
| 3 | B | B | B | B | 64 | 256 |

NOTES:
1. The dash ( — ) for switch 34 in mode 1 means that the position is of importance because switch 33 is in position A.
2. The number of bauds per increment means the number of baud intervals that elapse between consecutive increments involved (timing or phase).
3. "Alternate " in the above table means that switch 31 alternates, remaining in one position for 8 bauds, then in the other position for 8 bauds. In mode 2, a pulse is fed once every 8 bauds through switch 35, position A and gate 23. Then, because of the alternating of switch 31, a pulse is fed once every 16 bauds to ADD/DELETE circuit 27, causing the timing to be incremented once every 16 bauds.

Near the beginning of receiver operation, the receiver goes first through modes 1 and 2 and then switches to mode 3, and remains in mode 3 during normal data transmission. The main purpose of modes 1 and 2 is to ensure convergence of the initial learning of the combined equalization, timing and carrier phase. These modes have also been designed to ensure achievement of near-optimum adjustment of the equalization, timing and carrier phase within a reasonable length of time. Approximately one and three seconds are allowed for modes 1 and 2, respectively, although the times allowed can vary substantially with the application. Mode 3 is a precise, slow, highly stable mode used during regular data transmission.

SYSTEM OPERATION

Single bit compare circuit 21 generates a binary signal Sgn $(g_1 - g_{-1})$ as before; and this binary signal is fed to gate 23. During the first part of the fine timing and fine carrier phase adjustment process (mode 1), this signal Sgn $(g_1 - g_{-1})$ will be used to alternately adjust both the baud timing and the carrier phase. Initially switches 33 and 35 are in their A positions and switch 31 alternates at a fixed rate, approximately once every 8 bauds. With switch 35 in its A position, a pulse is fed to gate 23 at a fixed rate of approximately once every 8 bauds. The combined action of gate 23 and the alternating switch is to admit the signal Sgn $(g_1 - g_{-1})$ to ADD/DELETE circuit 27 approximately once every 16 bauds and to admit this same signal to ADD/DELETE circuit 26 approximately once every 16 bauds. The operating times of ADD/DELETE circuits 26 and 27 are staggered so that these two devices do not function at the same time. One advantage of such staggering is that the overall jitter effects caused by the incrementing are reduced by not incrementing the timing and carrier phase at the same time.

The following table shows the action of the ADD/DELETE circuits as a function of time and the signal Sgn $(g_1 - g_{-1})$, where T is the time per baud and $n$ is an integer approximately equal to 8:

| Time | Switch #31 Position | SGN $(g_1 - g_{-1})$ | Action of ADD/ DELETE **#26** | Action of ADD/ DELETE **#27** |
|---|---|---|---|---|
| $n$T | A | − | Adds pulse to Clock Output | None |
| $n$T | A | + | Deletes Pulse from Clock Output | None |
| $(n+1)$T | B | − | None | Deletes Pulse From Clock Output |
| $(n+1)$ | B | + | None | Adds Pulse to Clock Output |
| $(n+2)$T | A | − | Adds Pulse to Clock Output | None |
| $(n+2)$T | A | + | Deletes Pulse from Clock Output | None |
| Etc. | Etc. | Etc. | Etc. | Etc. |

At each time Sgn $(g_1 - g_{-1})$ will be either + or −, and the above table shows the action of each ADD/DELETE circuit for each of these two possibilities.

When ADD/DELETE circuit 26 adds a pulse to the clock output, the output carrier phase is advanced by a small increment; whereas, when ADD/DELETE circuit 26 deletes a pulse, the output carrier phase is delayed by a small increment. Similarly, when ADD/DELETE circuit 27 adds or deletes a pulse, the output baud timing is advanced or delayed, respectively, by a small increment.

For every timing error there is a corresponding carrier phase error that has approximately the same effect upon the overall sampled transmission system pulse response. Also, when the carrier phase is shifted relative to the optimum carrier phase, the baud timing can be shifted approximately offset the effects of this phase shift. In the first mode of the fine correction process, the timing and carrier phase are not necessarily pulled toward the overall optimum. Instead, the timing and carrier phase are, in a sense, pulled toward each other until the timing is approximately optimum for use with the carrier phase that exists. If the same method of adjustment were utilized too long, the timing and phase could drift together through very large errors. Therefore, this adjustment method (used in the first part of the adjustment process) is used just long enough to ensure that the carrier phase and timing will be pulled together, to where the timing is approximately optimum for use with whatever carrier phase happens to exist at the end of this first part of the fine timing and fine phase adjustment process.

In a typical application the maximum carrier phase error at the beginning of fine phase correction is roughly ±20° (greater accuracy of the coarse phase correction is desirable if practical). When the carrier phase error is +20°, the timing error at the beginning of fine correction should be between 0 and +0.4 bauds; whereas, when the carrier phase error is −20°, the timing error at the beginning of fine correction should be between 0 and −0.4 bauds. Also, at this time, coarse equalization has been achieved; i.e., the equalizer had adapted to the suboptimum carrier phase and baud timing that exists as well as to the channel characteristics. Suppose, for example, the carrier phase is delayed 20° relative to the optimum and the baud timing is delayed 0.1 baud interval with respect to the overall optimum. This baud timing is advanced by approximately 0.12 baud times relative to the timing that would be optimum for use with this 20° carrier phase error. During the first part of the fine timing and fine carrier phase adjustment process, the carrier phase is advanced at a fixed rate; for example, a 0.132° increment every 16 baud intervals; whereas, the baud timing is delayed at a fixed rate, for example, a 0.0005 baud interval increment every 16 baud intervals. The timing and phase will both be adjusted at a fixed rate until Sgn($g_1 - g_{-1}$) changes; and this change will occur only when the timing and phase have become approximately right for each other (although the two have not yet been adjusted to the overall optimum). In this example, the timing and phase will become approximately right for each other in about 3,200 baud intervals after the fine adjustment process begins. However, since we must allow for the worst initial combination of timing and phase errors, we should allow approximately 4,800 baud intervals (one second) for the first part of the fine adjustment process when the worst expected combination of errors is a phase error of +20° with a timing error of 0 or +0.4 bauds, or a phase error of −20° with a timing error of 0 or 0.4 bauds.

After a preset time interval, approximately 4,800 bauds, in our present example, switch 33 switches to its B position and the second mode of the fine carrier phase and fine timing adjustment process begins. During this mode, the output baud timing is controlled by $g_1$ and $g_{-1}$ operating through the single-bit compare circuit 21, gate 23, switch 31, ADD/DELETE 27 and frequency divider 29 as before. The timing increment size and frequency of timing adjustment are the same as before. During this phase, the output baud timing is controlled by $g_1$ and $g_{-1}$ operating through the single bit compare circuit 21, gate 23, switch 31, ADD/DELETE 27 and frequency divider 29 as before. The timing increment size and frequency of timing adjustment are the same as before.

However, the carrier phase is now controlled by the signals $g_2$ and $g_{-2}$ operating through single bit compare 20, gate 22, switch 33, ADD/DELETE circuit 26, frequency divider 28 and the filter 30. The single bit compare circuit generates the binary signal Sgn($g_2 - g_{-2}$). During this mode of the adjustment process, switch 34 is in its position A and closes gate 22 at equal time intervals, approximately once every 64 bauds. At each closing of gate 22, the signal Sgn($g_2 - g_{-2}$) causes the ADD/DELETE 26 to add or delete a pulse to the pulse train from the stable clock 25. A pulse is added when Sgn($g_2 - g_{-2}$) is positive and deleted when Sgn($g_2 - g_{-2}$) is negative. Each such addition or deletion of a pulse advances or delays the phase of the output carrier by a small increment, approximately 0.132°. The timing adjusts faster than the carrier phase because it is incremented more often. Convergence of this method, using Sgn($g_1 - g_{-1}$) to adjust timing and Sgn($g_2 - g_{-2}$) to adjust the carrier phase, depends upon adjusting the timing more rapidly than the carrier phase, so that the timing is approximately right for the carrier phase at all times during the adjustment process. Also, the equalizer adapts more rapidly than the timing.

If we assume, for example, that the carrier phase error is 20° from optimum at the beginning of this second phase of the fine adjustment process, incrementing the carrier phase by 0.132° every 64 bauds results in the carrier phase pulling to approximately the optimum value in approximately 12,000 bauds.

A fixed time interval of approximately 15,000 bauds (or approximately 3 seconds) is allowed for the second phase of the fine adjustment process. At the end of this time interval, switches 35 and 34 switch to their B positions and the final mode of the fine adjustment process begins.

In this final mode, $g_1$ and $g_{-1}$ still control the timing as before with the following exception: With switch 35 in its B position, gate 23 is closed less often than before, so the timing is incremented less frequently, approximately once every 64 bauds.

The signals $g_2$ and $g_{-2}$ still control the output carrier phase as in mode two of the fine adjustment process with the following exception: With switch 34 in its B position, gate 22 is closed less often and the output carrier phase is incremented less frequently, approximately once every 256 bauds.

At the beginning of the third mode of the fine timing and fine carrier phase adjustment process, regular data transmission is started.

We have used three modes in the fine adjustment process for the following reasons:

1. alternating use of Sgn ($g_1 - g_{-1}$) to control the timing and carrier phase together as in mode 1, but, this method cannot be used too long because the timing and phase would drift together through essentially all possible sample timings and carrier phases;

2. use of Sgn ($g_1 - g_{-1}$) to control the timing and Sgn ($g_2 - g_{-2}$) to control the carrier phase cannot be used when the timing and carrier phase are not closely coordinated, but, after the timing and carrier phase have been coordinated (pulled together), this method can be used as in mode 2 to pull the timing and carrier phase to their approximate optimum values;

3. finally, very slow adjustment of the timing and carrier phase is used in mode 3 during regular data transmission to allow the timing, carrier phase and equalization to continually adapt to the varying channel with precision and high stability, while "learning" from the pseudo-random data signal in the presence of various disturbances.

In FIG. 1, a frequency divider can be inserted between the stable clock and either or both of the two ADD/DELETE circuits. Several rearrangements of the switching are possible while accomplishing the same basic modes of operation. For example, instead of allowing switch 31 to continue alternating during the second mode of the adjustment process, we could stop it in its position B and operate switch 35 to a third position not shown in FIG. 1.

The modes of operation described above can be changed in various ways, depending upon the application. For example, mode 2 could be eliminated and we could switch directly from mode 1 to mode 3.

Instead of switching from mode 1 to mode 2 after a fixed time interval, this mode switching could be made to occur automatically whenever the absolute value of $g_1 - g_{-1}$ drops below a preset threshold value. For practical reasons the total duration of modes 1 and 2 combined should be fixed, so the shorter mode 1, the longer mode 2. An advantage of this arrangement is that, regardless of the initial conditions at the beginning of mode 1 approximately the maximum feasible length of time would be allowed for precise convergence in mode 2 for a given total length of the two modes combined.

Another important potential modification of the mode switching is to automatically switch from mode 3 back to mode 1, except possibly with different rates of adjustment from mode 1, whenever signal has been lost for several milliseconds. Such a feature could enable the receiver to recover from signal dropouts of transients of intermediate durations; i.e., durations too long to permit recovery when operating in mode 1 but not so long that it becomes necessary for both the transmitter and receiver to reinitiate the entire sequence of coarse and fine adjustment processes. The automatic mode switching can be controlled by measuring the length of time that the received signal or tone level fails to fall within certain bounds and switching modes whenever this length of time exceeds certain bounds. Instead of signal or tone level, measure of the overall receiver performance such as an integral of the error signal (the absolute difference between each equalized signal sample and the corresponding digit decision) could be used.

Also, the numerical values given above were selected for a 9,600 bps data modem for leased voice-band telephone channels; and, these numbers can be changed substantially, especially when the application is changed. In general, the higher the data rate, the faster the equipment will operate because, under otherwise equivalent conditions, each mode of the adjustment process tends to require a given number of bauds, regardless of the baud rate. However, the slowness of operation of the timing and carrier recovery in each mode should be increased with increasing severity of channel conditions, increasing requirements on the precision and stability of the timing and carrier phase, and increasing ratio of data rate to bandwidth. In general, at a given data transmission rate, the higher the required overall modem performance requirements, the slower the timing and carrier recovery should operate, until a practical limit on slowness of operation (imposed by considerations such as stable clock stability) is reached.

FIGURE 2 EMBODIMENT

Figure 2:
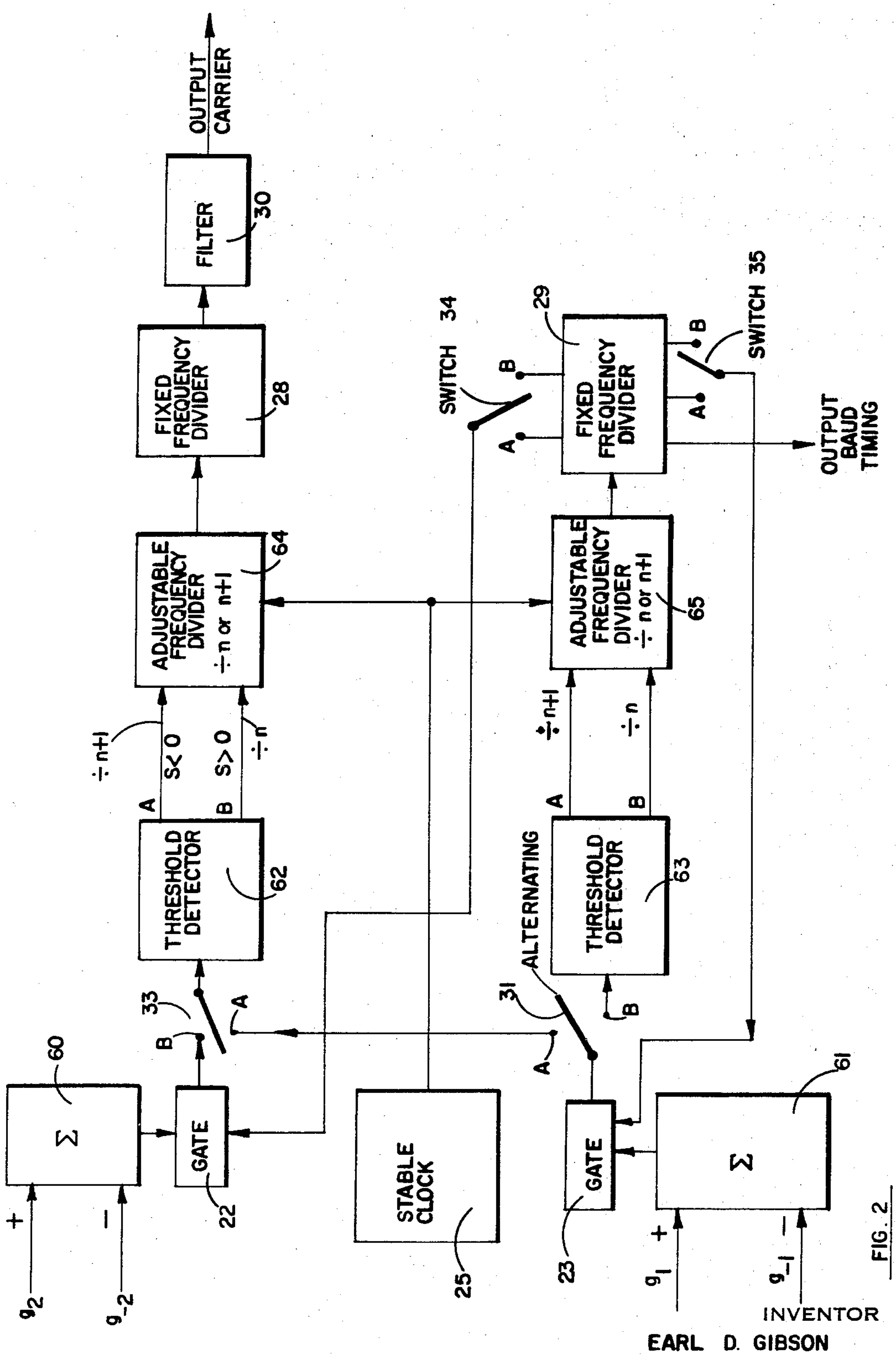
FIG. 2 illustrates in block diagram form a second embodiment of the invention.

FIG. 2 presents an alternate version of the fine timing and fine carrier phase correction system, still based upon using adaptive equalizer tap-gains to control the timing and carrier phase. The modes of adjustment and the operation of the switches are generally the same as shown in conjunction with the embodiment of FIG. 1.

The pulse train from the stable clock 25 is fed to adjustable frequency dividers 64 and 65, each of which nominally divides the clock rate by $n + ½$. Frequency divider 28 then divides the pulse rate down to a close approximation of the correct carrier frequency; whereas, frequency divider 29 divides the clock rate down to a close approximation of the correct output baud timing.

In the first mode of the fine adjustment process, the signal $g_1 - g_{-1}$ is alternately fed to threshold detectors 62 and 63, and is fed to each of these threshold detectors once every several bauds. Threshold detector 62 generates the output signal A when its input is positive and generates the signal B when its input is negative. The signal A causes the adjustable frequency divider to divide the frequency by $n + 1$, thereby delaying the output carrier phase relative to that phase that would be obtained if the frequency were divided by $n + ½$. Similarly, the signal B causes the adjustable frequency divider to divide by n, thereby causing a relative advance of the output carrier phase. In a similar manner, the signal $g_1 - g_{-1}$ operates at regular time intervals through threshold detector 63 and adjustable frequency divider 65 to delay or advance the phase of the output baud timing according to the polarity of $g_1 - g_{-1}$.

In the second mode of the fine adjustment process, the operation is essentially the same as in mode 1 with the following exceptions: (1) Control of the carrier phase passes from $g_1 - g_{-1}$ to $g_2 - g_{-2}$ operating through summer 60, gate 22, switch 33, threshold detector 62 and adjustable frequency divider 64; (2) The carrier phase is adjusted less frequently than in mode 1. Mode 3 is essentially the same as mode 2 with the exception that the timing and carrier phase are both adjusted less frequently than in mode 2. Each adjustable frequency divider can be essentially a counter that counts either $n$ or $n + 1$ input pulses (as commanded by the control signal from the associated threshold detector) before it generates an output pulse.

Figure 3:
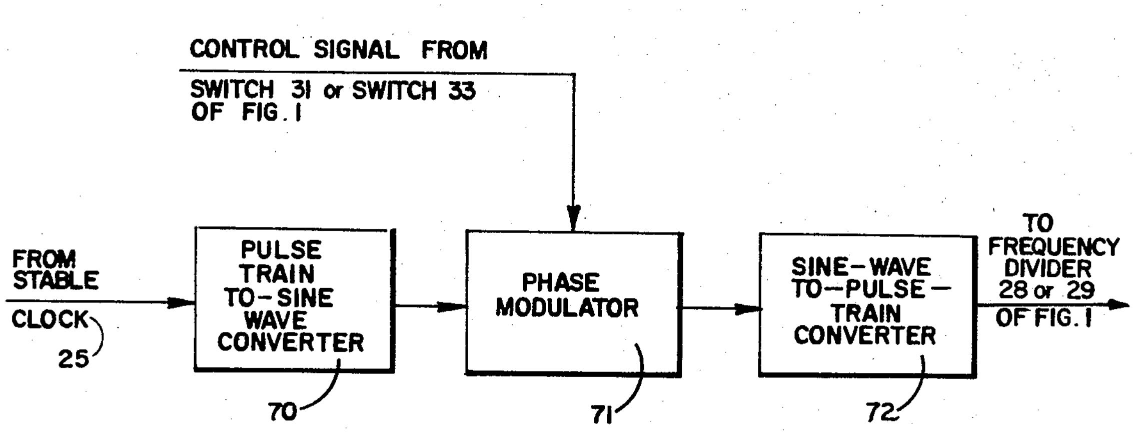
FIG. 3 illustrates in block diagram form a variation of one of the blocks of FIG. 2.

Each threshold detector and its associated adjustable frequency divider in FIG. 2 could be replaced by the arrangement shown in FIG. 3. The pulse train from the stable clock 25 passes through the pulse-train-to-sine-wave converter 70, the phase modulator 71 and the sine-wave-to-pulse-train converter 72, then to either frequency divider 28 or frequency divider 29, depending upon whether this equipment is being used to control the carrier phase or the timing. The control signal from switch 33 or switch 31 of FIG. 2 (depending on the use for timing or carrier phase control) drives the phase modulator 71 of FIG. 3 so that the phase of the sine wave from the pulse-train-to-sine wave converter 72 is shifted by an amount proportional to this control signal. Thus, the equalizer tap-gains control the phase modulator 71 (or modulators) which indirectly control the phase of the output carrier phase and/or the output baud timing. When the tap-gain signals are in digital form, it would be necessary to use a digital-to-analog converter to convert the control signal to analog form before it enters the phase modulator.

The equipment shown in FIG. 3 can also be placed after frequency divider 29 of FIG. 2. Also, we could eliminate the sine-wave-to-pulse-train converter 72 from FIG. 3, place the remaining equipment of FIG. 3 on the output of frequency divider 28 of FIG. 2 and eliminate the filter of FIG. 2.

OPERATING THEORY

The following explains the reasons why the equalizer adjustments can be used to control the timing and carrier phase. The following explanation will be in terms of the system pulse response for single sideband, partial response signaling; but, the same general approach can be applied to other types of signaling. The following will explain the conditions under which important adjustment control signals can be used.

Figure 4:
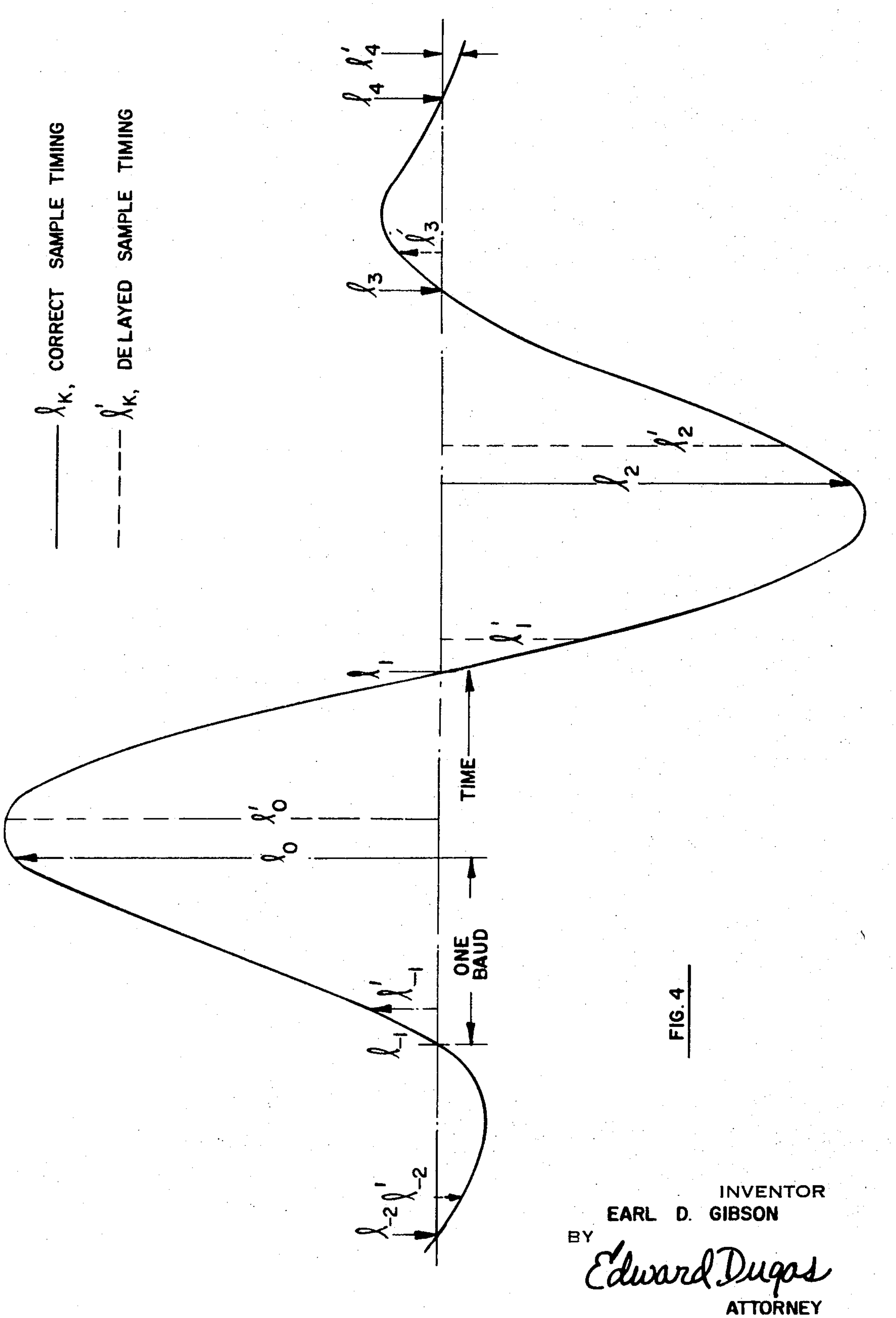
FIG. 4 illustrates an ideal system pulse response which is useful in understanding the operation of the embodiments shown in FIGS. 1 to 3.

FIG. 4 shows the system pulse response with accurate equalization and optimum carrier phase. Also, FIG. 4 shows the ideal sample timing and a delayed sample timing. With the ideal sample timing $l_2 = -l_o$ and all other $l$'s equal zero, where the $l$'s are the pulse response amplitude samples. As can be seen, the main effect of the delayed sample timing is to cause $l_{-1}$ and $l_3$ to go positive while $l_1$ goes negative.

Figure 5A:
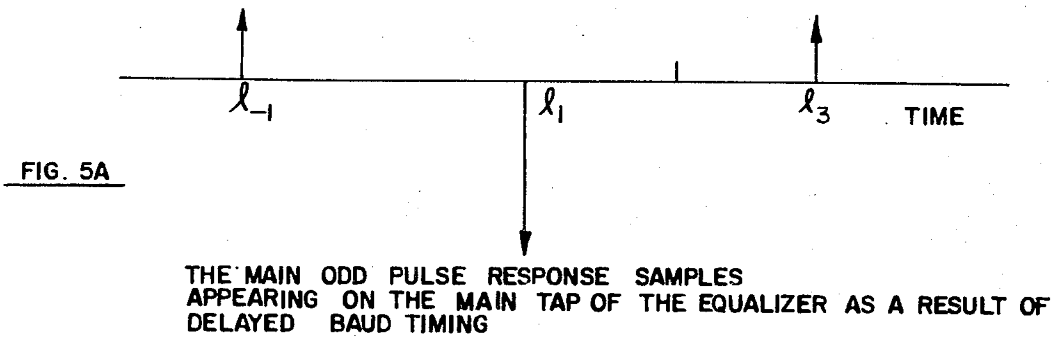
FIGS. 5*a* to 5*d* illustrate pulse response samples which are useful in understanding the operation of the embodiments shown in FIGS. 1 to 3.
Figure 5B:
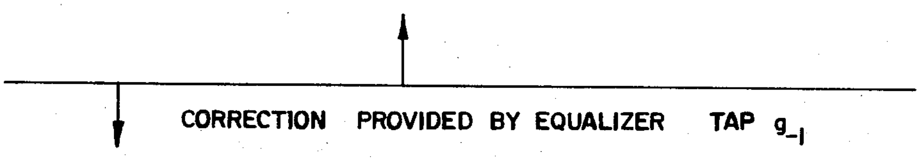

FIGS. 5*a* to 5*d* illustrate the action of equalizer taps $g_{-1}$ and $g_1$ in correcting the errors caused by the delayed sample timing. FIGS. 5*a* to 5*d* do not accurately show all of the effects of delayed sample (or baud) timing or the effects of all equalizer taps in correcting these effects; but, these figures do illustrate the reasons $g_1 - g_{-1}$ can be used to control the baud timing. The samples of FIG. 5*a* are taken directly from FIG. 4 and illustrate the samples $l_{-1}$, $l_1$ and $l_3$ appearing on the main equalizer tap (or with no equalizer adaptation to the timing error) as a result of the timing error. Equalizer tap $g_{-1}$ provides an echo of the system pulse response multiplied by $g_{-1}$ and advanced in time by one baud time. Since the main samples of the pulse response are $l_o$ and $l_2$, the main samples of this echo are those shown in FIG. 5*b*. This equalizer tap-gain is automatically adjusted to drive $l_1 - l_{-1}$ toward zero and therefore assumes a negative value to provide the negative echo samples shown in FIG. 5*b*.

Figure 5C:
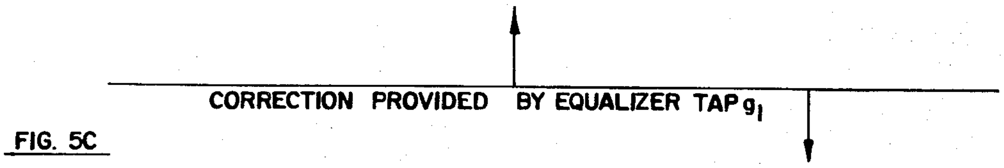
Figure 5D:
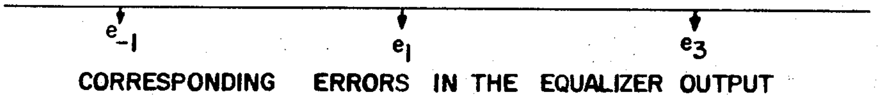

Similarly, the tap-gain $g_1$ goes positive to provide the correction shown in FIG. 5*c*. FIG. 5*d* shows the approximate results of combined action of the two equalizer tap gain adjustments. The main fact to note here is that the delayed timing caused $g_1 - g_{-1}$ to go positive. Therefore, when $g_1 - g_{-1}$ goes positive, the baud timing should be advanced.

Figure 6:
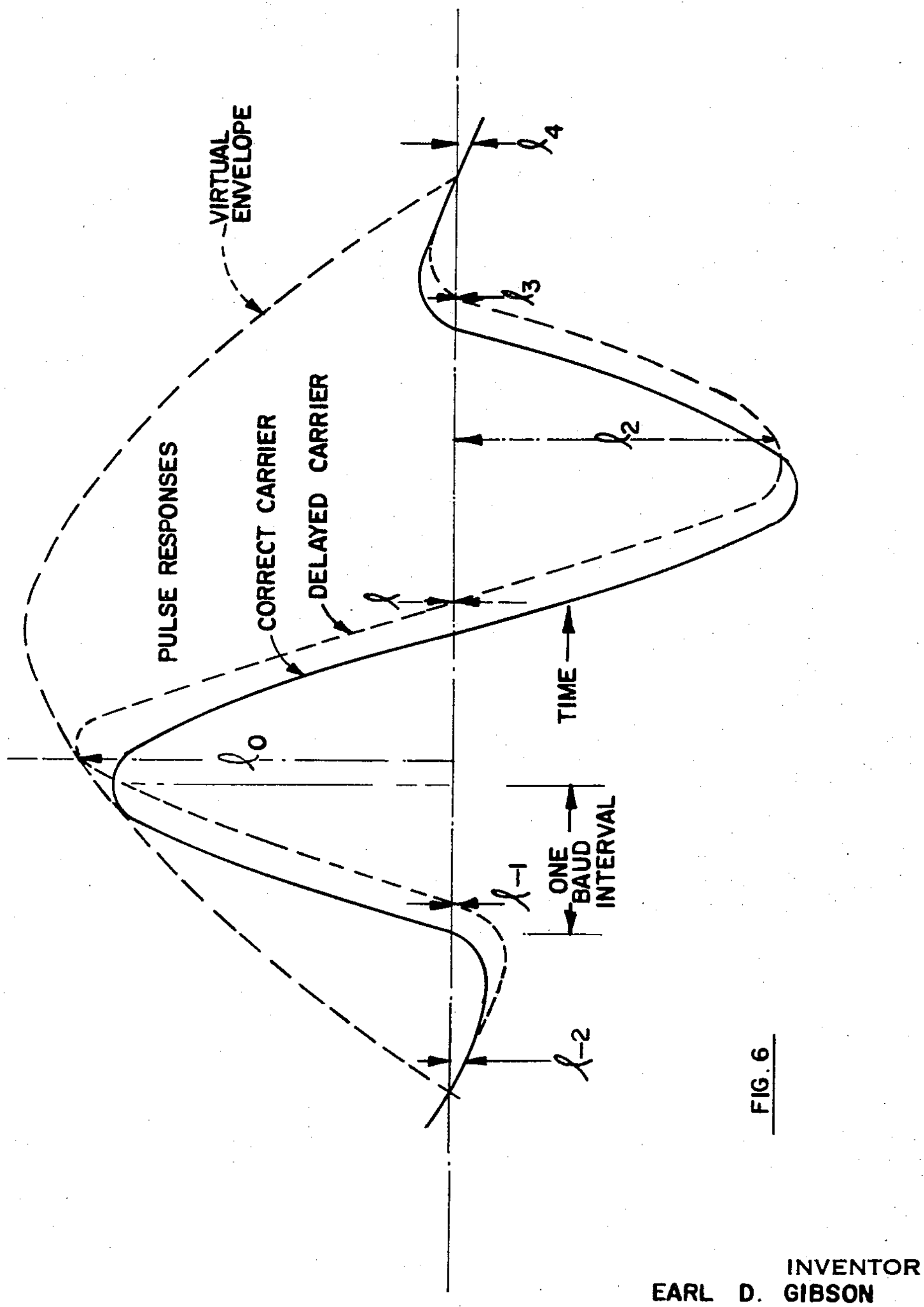
FIG. 6 illustrates pulse response of a correct and a delayed carrier signal along with the virtual envelope associated therewith.

FIG. 6 shows the effects of a delay in the carrier phase upon the system pulse response. This pulse response can be visualized as the product of a virtual carrier and a virtual envelope. The effect of a shift of the phase of the real carrier used for demodulation is to shift the phase of the virtual carrier without shifting the virtual envelope.

Suppose the timing is locked to the point where $l_1 \approx l_{-1} \approx l_3 \approx 0$ when the carrier phase is in error. Then, the sample timing is as shown in FIG. 6 where we see that $l_{-2}$ and $l_4$ are negative, $l_o$ and $l_2$ go slightly more positive, while the other $l$'s are not changed much by the shift of phase and timing away from the ideal phase and timing.

Figure 7A:
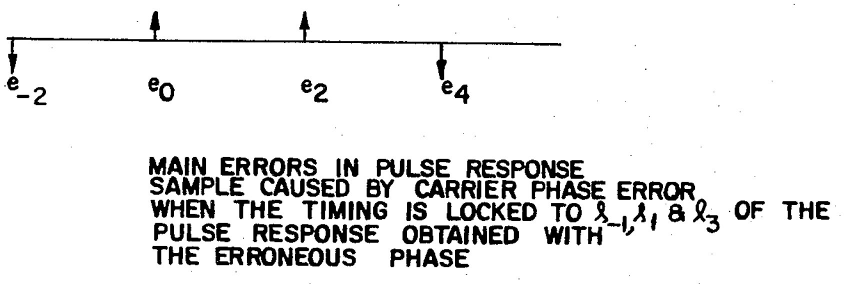
FIGS. 7*a* to 7*d* illustrate errors and corrections applied to the embodiments of FIGS. 1 to 3.
Figure 7B:
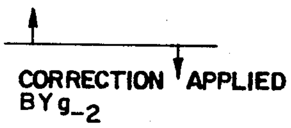
Figure 7C:
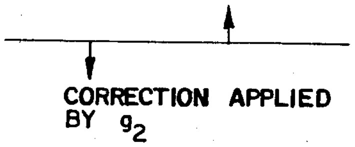
Figure 7D:
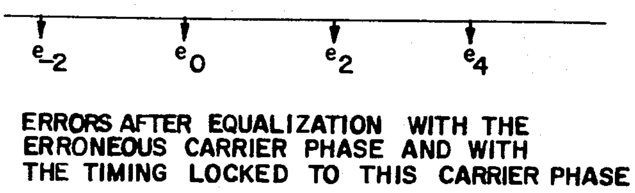

FIGS. 7*a* to 7*c* illustrate the main actions of the equalizer tap-gains $g_{-2}$ and $g_2$ in correcting this situation. Each $e_k$ is the error in the corresponding $l_k$ caused by the error in carrier phase. It is assumed that the timing has been driven to the point where $l_{-1} \approx l_1 \approx l_3 \approx 0$ (or almost equivalent to where $g_{-1} - g_1$). Only the main errors in the pulse response samples and the main effects of $g_{-2}$ and $g_2$ are shown.

Note that, with the delayed carrier phase, $g_{-2}$ goes positive and $g_2$ goes negative. Therefore, when $g_2 - g_{-2}$ goes negative the carrier phase should be advanced and when $g_2 - g_{-2}$ goes positive the carrier phase should be delayed.

In the above explanation, it was assumed that the timing is adjusted more rapidly than the carrier phase and that the timing is, in effect, locked to the point where $g_1 - g_{-1} = 0$. To a first approximation, this is the same as keeping the timing adjusted to where $l_{-1} \approx l_1 \approx l_3 \approx 0$. When the timing is not kept adjusted in this manner, the polarity of $g_2 - g_{-2}$ is not necessarily a correct indicator of the proper direction to adjust the carrier phase.

When the initial errors in timing and carrier phase are fairly large, independent and unknown apriori, a criterion other than $g_2 - g_{-2}$ must be used initially to adjust the carrier phase. One method of overcoming this difficulty is to use $g_1 - g_{-1}$ to alternately adjust the timing and carrier phase. A study of the various polarities involved in FIGS. 4 through 7 will show that Sgn($g_1 - g_{-1}$) can always be used to drive the timing and carrier phase toward each other, i.e., toward values such that the signal is samples at approximately the main zero crossing of the system pulse response, although the carrier phase can be substantially suboptimum. After the sample timing and carrier phase have thus been pulled together, it is better to switch to using $g_1 - g_{-1}$ for timing control and $g_2 - g_{-2}$ for carrier phase control.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

I claim:

1. In combination with a high speed digital data receiver having a transversal equalizer with multiple adjustable attenuators, the improvement comprising:

a first comparator connected to the output of at least two adjustable attenuators of said equalizer, said first comparator providing an output signal corresponding to the sign of the difference between the gains at said two adjustable attenuators of said equalizer, said first comparator providing an output signal corresponding to the sign of the difference between the gains at said two adjustable attenuators;

a second comparator connected to the output of at least two other of the adjustable attenuators of said equalizer, said second comparator providing an output signal corresponding to the sign of the difference between the gains at said other two adjustable attenuators;

a clock means for providing a train of clock pulses;

a first and a second ADD/DELETE means receiving as an input said train of clock pulses;

first and second gate means connected to receive the output signal from said first and said second comparators, respectively;

a fixed rate alternating switch means for connecting the output of said second gate means alternately to the input of said first and said second ADD/DELETE means;

a first switch means for connecting the input of said first ADD/DELETE means in one position to the output of said first gate means and in the other position to said fixed rate alternating switch means;

first and second frequency divider means connected to receive the output from said first and said second ADD/DELETE means, respectively, the output of said first frequency divider means being a train of pulses that are proportional to the output carrier with the output of said second frequency divider being a train of pulses proportional to the output baud timing; and two feedback means for connecting selected outputs from said second frequency divider means back to said first and said second gate means so as to control the time intervals at which said first and said second ADD/DELETE means add or delete pulses to the pulse trains entering said first and said second frequency dividers, thereby controlling the time intervals between consecutive incremental adjustments of the output carrier phase and the output baud timing.

2. In combination with an adjustable transversal equalizer having a plural tapped delay line, with adjustable attenuators connected to at least each delay line with one main tap for a major signal component and a summation circuit for combining the attenuated outputs of the adjustable attenuators into a single coordinated signal, a carrier and timing recovery system comprising in combination:

a first comparing means for taking the difference between first adjustable attenuators outputs located on either side of said main signal tap attenuator and for providing a difference signal proportional to said difference;

a second comparing means for taking the difference between adjustable attenuator outputs located on either side of said first adjustable attenuators and for providing a difference signal proportional to said difference;

a first and second gate means for receiving the difference signal from said first and second comparing means, respectively, and for gating the received signals to individual output terminals upon receipt of respective control signals;

a first and a second pulse generating means for generating trains of pulses, said generating means incrementally advancing or retarding the phase of said trains of pulses, the choice between advancing or retarding being controlled by the sign of said difference signal from said first or said second comparing means, respectively, the timing of each advance/retardation being controlled by said first and said second gate means, respectively, the output pulses from said first pulse generating means being the system's output carrier pulses and the output pulses from said second pulse generating means being the system's output timing pulses, said system output timing pulses being fed back through additional frequency division to said first and said second gate means as said control signals;

alternating switch means for alternately connecting the output terminal of said second gate means to the inputs of said first and said second pulse generating means; and switch means interposed at the input of said first pulse generating means for connecting said input in one position to the output terminal of said first gating means and in the other position to the output of said alternating switch means.

3. The invention according to claim 2 wherein said second pulse generating means is comprised of:

a clock means for generating a train of clock pulses at a frequency greater than the desired system baud frequency;

means responsive to the output signal of said second gating means for adding or deleting a pulse from said clock pulse train according to the sign of said output signal;

frequency down counter means for dividing the pulse train from said ADD/DELETE means down to at least the desired baud frequency to provide gate timing control pulse trains; and first and second switch means for connecting the provided gate timing control pulse trains to the control terminal of said first and second gate means, respectively.

4. The invention according to claim 2 wherein said first pulse generating means is comprised of:

a clock means for generating a train of clock pulses at a frequency greater than the desired system's baud frequency;

means responsive to the output signal of said first gating means for adding or deleting a pulse from said clock pulse train according to the sign of said output signal; and frequency down counter means for dividing the pulse train from said ADD/DELETE means down to at least the desired baud frequency to provide the system's output carrier pulses.

5. In combination with a high speed digital data receiver having a transversal equalizer with multiple tap gains and adjustable attenuators connected to each of the tap gains, the improvement comprising:

a first comparator connected to the output of at least two adjustable attenuators of said equalizer, said first comparator providing an output signal which is a function of the difference between the outputs of said two adjustable attenuators;

a second comparator connected to at least two other of the outputs of said adjustable attenuators, said second comparator providing an output signal corresponding to the sign of the difference between the outputs of the two other adjustable attenuators;

means for providing a periodic pulse train signal;

a first modulating means responsive to the signal from said first comparator for modulating said periodic pulse train means;

a second modulating means responsive to the signal from said second comparator for modulating the signal from said periodic pulse train means;

first and second frequency divider means connected to receive the output from said first and said second modulating means, respectively;

switch means interposed between the output of said first and second modulating means for controllably connecting the output of said first and second modulating means to said first and said second comparator; and feedback means for receiving a signal from said second frequency divider means and feeding said signal to said switch means to control the output signals to said first and said second modulating means.

* * * * *